United States Patent
Kawasaki et al.

(10) Patent No.: US 6,827,051 B2
(45) Date of Patent: Dec. 7, 2004

(54) INTERNAL EGR QUANTITY ESTIMATION, CYLINDER INTAKE AIR QUANTITY CALCULATION, VALVE TIMING CONTROL, AND IGNITION TIMING CONTROL

(75) Inventors: Takao Kawasaki, Kanagawa (JP); Masahiro Arai, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/912,388

(22) Filed: Jul. 26, 2001

(65) Prior Publication Data

US 2001/0042529 A1 Nov. 22, 2001

Related U.S. Application Data

(63) Continuation-in-part of application No. 09/728,477, filed on Dec. 4, 2000, now Pat. No. 6,412,458.

(30) Foreign Application Priority Data

Dec. 3, 1999 (JP) .............................. 11-344216
Dec. 1, 2000 (JP) ....................... 2000-367770

(51) Int. Cl.[7] ................................................ F01L 1/34
(52) U.S. Cl. .................. 123/90.15; 60/285; 123/568.14
(58) Field of Search ........................ 123/90.15, 568.14, 123/568.21, 681, 301, 435, 306, 90.17, 585, 90.11; 60/285

(56) References Cited

U.S. PATENT DOCUMENTS

| 3,714,932 | A | | 2/1973 | Meacham et al. | |
|---|---|---|---|---|---|
| 4,432,331 | A | * | 2/1984 | Yasuhara | 123/568.16 |
| 5,494,008 | A | * | 2/1996 | Ohkawa et al. | 123/90.17 |
| 5,632,257 | A | * | 5/1997 | Machida et al. | 123/435 |
| 5,635,634 | A | * | 6/1997 | Reuschenbach et al. | 73/118.2 |
| 5,682,864 | A | * | 11/1997 | Shirakawa | 123/568.21 |
| 5,703,285 | A | * | 12/1997 | Shimizu et al. | 73/118.1 |
| 6,000,385 | A | * | 12/1999 | Fukuma | 123/704 |
| 6,178,934 | B1 | | 1/2001 | Hirasawa et al. | 123/90.11 |
| 6,189,512 | B1 | | 2/2001 | Kawasaki et al. | 123/479 |
| 6,328,007 | B1 | * | 12/2001 | Hirasawa et al. | 123/568.14 |

FOREIGN PATENT DOCUMENTS

| DE | 3401362 A1 | 8/1984 |
|---|---|---|
| DE | 195 30 274 A1 | 2/1997 |
| DE | 197 53 969 A1 | 6/1999 |
| DE | 198 44 086 A1 | 11/1999 |
| EP | 1 104 822 A2 | 6/2001 |
| JP | 10-037727 | 2/1998 |

OTHER PUBLICATIONS

U.S. patent application Ser. No. 09/442,031, Arai et al., filed Nov. 17, 1999.
U.S. patent application Ser. No. 09/634,008, Hirasawa et al., filed Aug. 7, 2000.
U.S. patent application Ser. No. 09/634,880, Hirasawa et al., filed Aug. 7, 2000.

(List continued on next page.)

Primary Examiner—Thomas Denion
Assistant Examiner—Jaime Corrigan
(74) Attorney, Agent, or Firm—Foley & Lardner LLP

(57) ABSTRACT

A quantity of internal EGR gases remaining in an engine is estimated in accordance with an exhaust valve closing timing, an intake valve opening timing and an engine speed. The estimated internal EGR quantity is a sum of a base quantity and an increase correction quantity determined in accordance with a valve overlap period, its middle angular position in crankshaft rotation and intake pressure. The estimated internal EGR quantity is used for estimating an engine cylinder intake air quantity and for engine control such as ignition timing control, and intake air quantity control.

36 Claims, 14 Drawing Sheets

OTHER PUBLICATIONS

U.S. patent application Ser. No. 09/635,685, Toriumi, filed Aug. 10, 2000.
U.S. patent application Ser. No. 09/686,992, Arai et al., filed Oct. 11, 2000.
U.S. patent application Ser. No. 09/725,710, Kawasaki et al., filed Nov. 30, 2000.
U.S. patent application Ser. No. 09/727,552, Arai et al., filed Dec. 4, 2000.
U.S. patent application Ser. No. 09/727,554, Arai et al., filed Dec. 4, 2000.
U.S. patent application Ser. No. 09/727,787, Kawasaki et al., filed Dec. 4, 2000.
U.S. patent application Ser. No. 09/727,789, Arai et al., filed Dec. 4, 2000.
U.S. patent application Ser. No. 09/727,790, Kawasaki et al., filed Dec. 4, 2000.
U.S. patent application Ser. No. 09/734,611, Arai et al., filed Dec. 13, 2000.
U.S. patent application Ser. No. 09/736,576, Hori et al., filed Dec. 15, 2001.
U.S. patent application Ser. No. 09/764,071, Toriumi, filed Jan. 19, 2001.
Patent Abstract of Japan, vol. 1998, No. 06, Apr. 30, 1998 & JP 10 037727 A (Fuji Heavy Ind Ltd), Feb. 10, 1998—abstract—.
Patent Abstract of Japan, vol. 1999, No. 13, Nov. 30, 1999 & JP 11 223137 A (Nissan Motor Co Ltd), Aug. 17, 1999—abstract—.
Patent Abstract of Japan, vol. 1997, No. 12, Dec. 25, 1997 & JP 09 209895 A (Toyota Motor Corp), Aug. 12, 1997—abstract—.

* cited by examiner

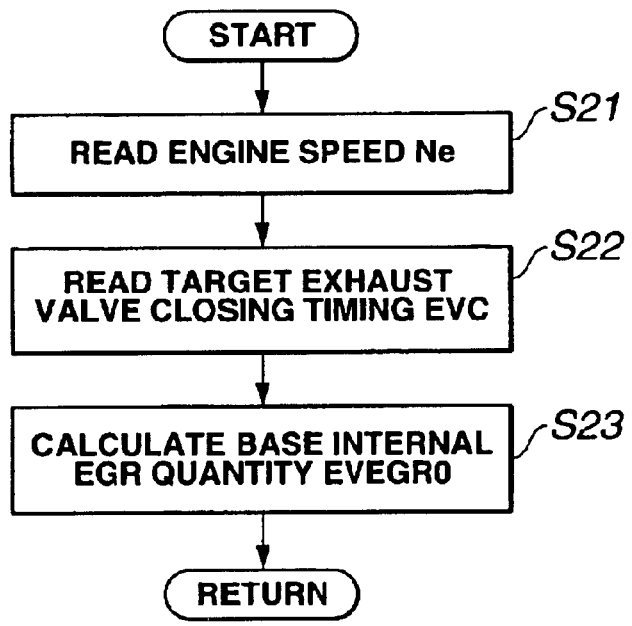
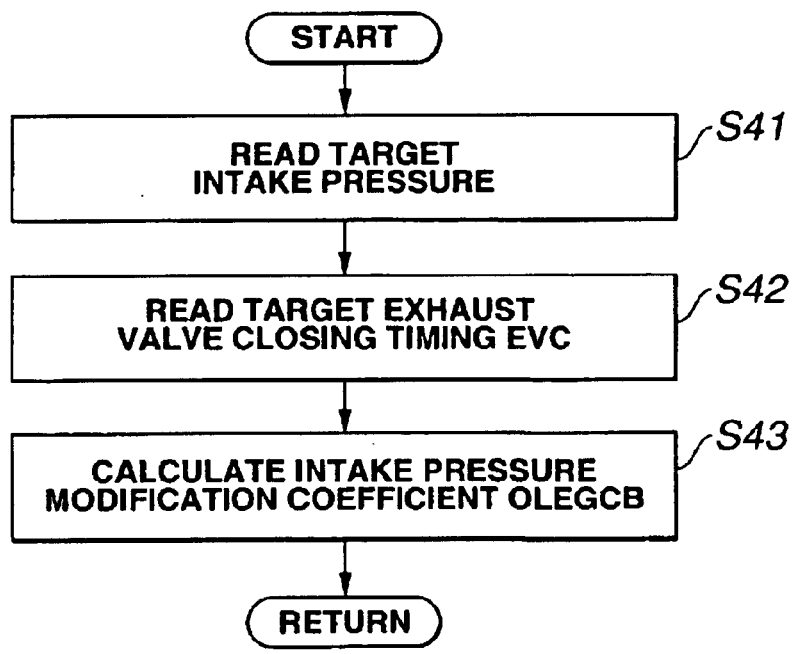

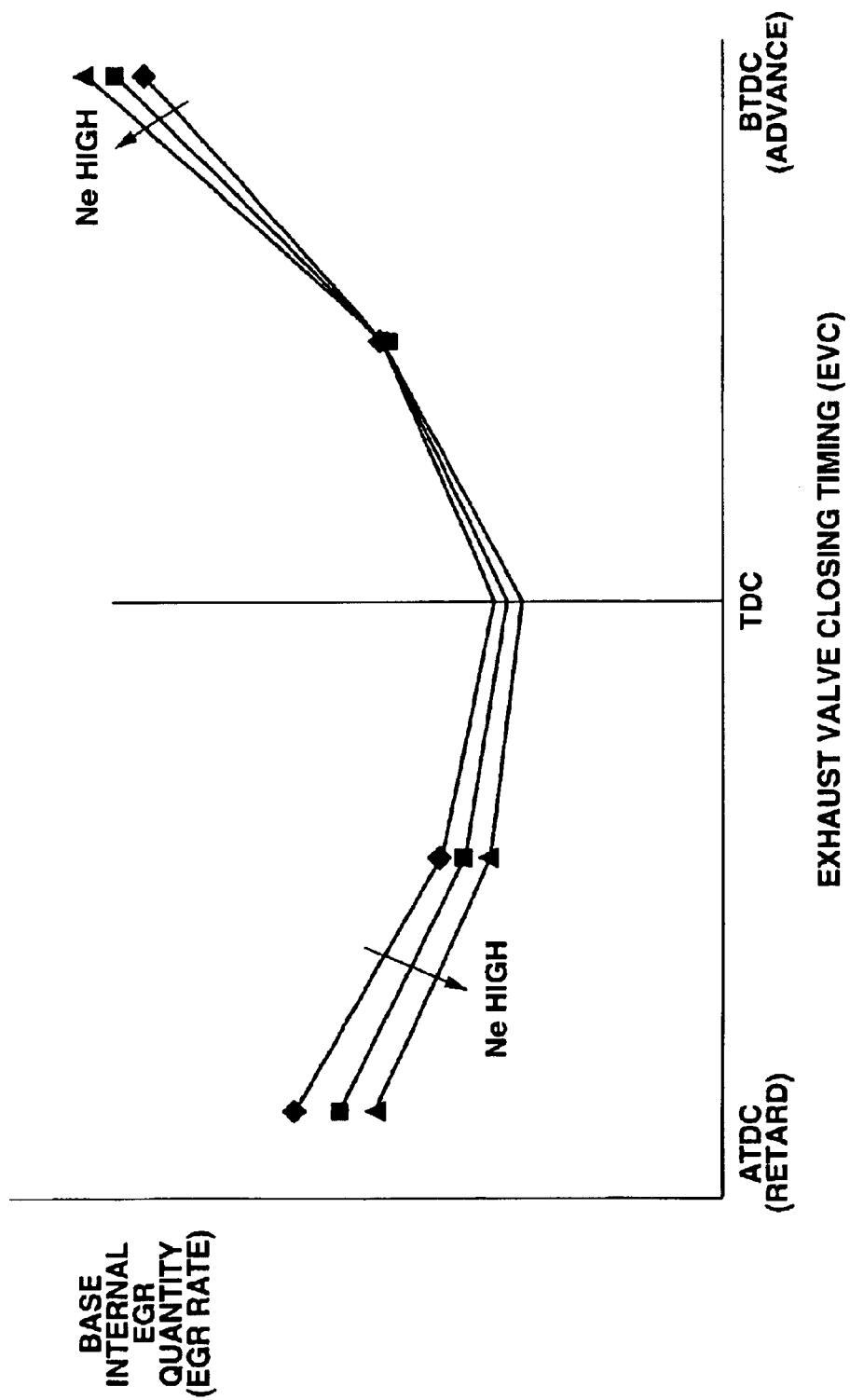

EXHAUST VALVE CLOSING TIMING (EVC)

INTERNAL EGR QUANTITY ESTIMATION, CYLINDER INTAKE AIR QUANTITY CALCULATION, VALVE TIMING CONTROL, AND IGNITION TIMING CONTROL

This application is a continuation-in-part application of U.S. patent application Ser. No. 09/728,477 filed Dec. 4, 2000, now U.S. Pat. No. 6,412,458.

BACKGROUND OF THE INVENTION

The present invention relates to control technique for controlling valve events of an engine with an actuator such as solenoid actuator, and in particular to control of an intake valve closing timing to vary an intake air quantity to obtain a desired engine torque.

Unlike an engine of a conventional type controlling the intake air quantity with a throttle valve, an engine of a new type (proposed by a Published Japanese Patent Application, Kokai No. H10(1998)-37727) is arranged to control the intake air quantity mainly by controlling the intake valve closing timing.

An intake air control system of such a type for controlling the intake air quantity by controlling the intake valve closing timing achieves a target air quantity (required intake air quantity) corresponding to required torque by controlling the volume of cylinder intake air corresponding to an effective intake stroke determined by the intake valve closing timing, at the intake pressure that is held approximately constant at the atmospheric pressure in the absence of a throttle valve, and that is determined in dependence on the throttle opening when there is provided a throttle valve.

SUMMARY OF THE INVENTION

To control the intake air quantity accurately by controlling the intake valve closing angle, the intake valve is to be closed at a piston position at which the cylinder contains an amount of fresh air corresponding to the target air quantity in addition to an amount of residual gases (internal EGR quantity) remaining in the combustion chamber. The internal EGR quantity of residual gases is influenced deeply by the existence or nonexistence of valve overlap and the length of valve overlap. The valve overlap condition has a great influence on the internal EGR quantity especially in a solenoid type valve actuating system having such a high response speed in opening and closing valves that the exhaust and intake valves are both held approximately in the fully open state during a valve overlap period. Accordingly, it has been found that simple correction or compensation for the internal EGR quantity is not always adequate for controlling intake air quantity and hence engine torque accurately. Moreover, even by a system devised to set target exhaust valve closing timing and target intake valve opening timing to obtain a proper internal EGR quantity and to adjust the target intake valve closing timing in conformity with the setting of the valve timings, an adequate control is difficult since the actual internal EGR quantity is affected by other factors besides valve timings.

Therefore, in order to achieve a responsive control performance with valve actuators, it is required to accurately determine an internal EGR quantity which tends to vary largely in a transient state.

Moreover, the accurate calculation of the internal EGR quantity is demanded for accurate feedback control of the cylinder intake air quantity, accurate control of air fuel ratio, accurate estimation of the cylinder intake air quantity, and control of ignition timing for optimum combustion efficiency.

It is, therefore, an object of the present invention to provide method and/or apparatus to estimate an internal EGR quantity and/or an engine cylinder intake air quantity accurately and responsively, and method and/or apparatus to control valve timing and/or ignition timing or other engine operating parameters accurately based on the result of estimation.

According to the present invention, a method for an engine, such as an engine equipped with a valve timing control apparatus to vary an exhaust valve closing timing, may be an internal EGR quantity estimating method, and the method comprises: obtaining information on the exhaust valve closing timing, an intake valve opening timing and an engine speed; and calculating an estimated internal EGR quantity of the engine in accordance with the exhaust valve closing timing, the intake valve opening timing and the engine speed.

The method according to the present invention may be an engine cylinder intake air quantity calculating method, and the method may further comprises: calculating an engine cylinder intake air quantity in accordance with the estimated internal EGR quantity.

The method according to the present invention may be an engine control method, and the method may further comprise: controlling valve timing and/or ignition timing of the engine in accordance with the estimated internal EGR quantity.

According to the present invention, an estimating or controlling apparatus or system for an engine, such as an engine equipped with a valve timing control apparatus to vary an exhaust valve closing timing, comprises: an estimating section to calculate the estimated internal EGR quantity of the engine in accordance with the exhaust valve closing timing, the intake valve opening timing and the engine speed. The apparatus or system may further comprises a controlling section to control the engine.

The apparatus according to the present invention may be a control apparatus for controlling an intake air quantity to an engine by varying an intake valve closing timing of the engine which comprises a controller that is configured or programmed:

to calculate a target air quantity in accordance with an engine operating state, to calculate an estimated internal EGR quantity of the engine in accordance with the engine operating state, to calculate a target intake valve closing timing in accordance with the target air quantity and the estimated internal EGR quantity, and to control an actual intake air quantity to the engine by controlling an actual intake valve closing timing of the engine to achieve the target intake valve closing timing.

A control apparatus according to one aspect of the invention comprises: means for determining the estimated internal EGR quantity; means for determine the target intake valve closing timing in accordance with at least the estimate internal EGR quantity; and means for controlling the intake air quantity to the engine by controlling an actual intake valve closing timing of the engine to the target intake valve closing timing.

According to the present invention, a control process for varying valve timings of intake and exhaust valves of an engine, comprises: estimating an internal EGR quantity in accordance with an engine operating state; and controlling an intake valve closing timing in accordance with a required intake air quantity and the internal EGR quantity.

BRIEF DESCRIPTION OF THE DRAWINGS

FIG. 4 is a flowchart showing a subroutine for determining a base internal EGR quantity in a non-overlap state according to the first embodiment.

FIG. 6 is a flowchart showing a subroutine for determining a modification coefficient based on an intake pressure, for modifying the overlap correction quantity.

FIG. 7 is a graph showing a characteristic of the base internal EGR quantity.

DETAILED DESCRIPTION OF THE INVENTION

Figure 1:
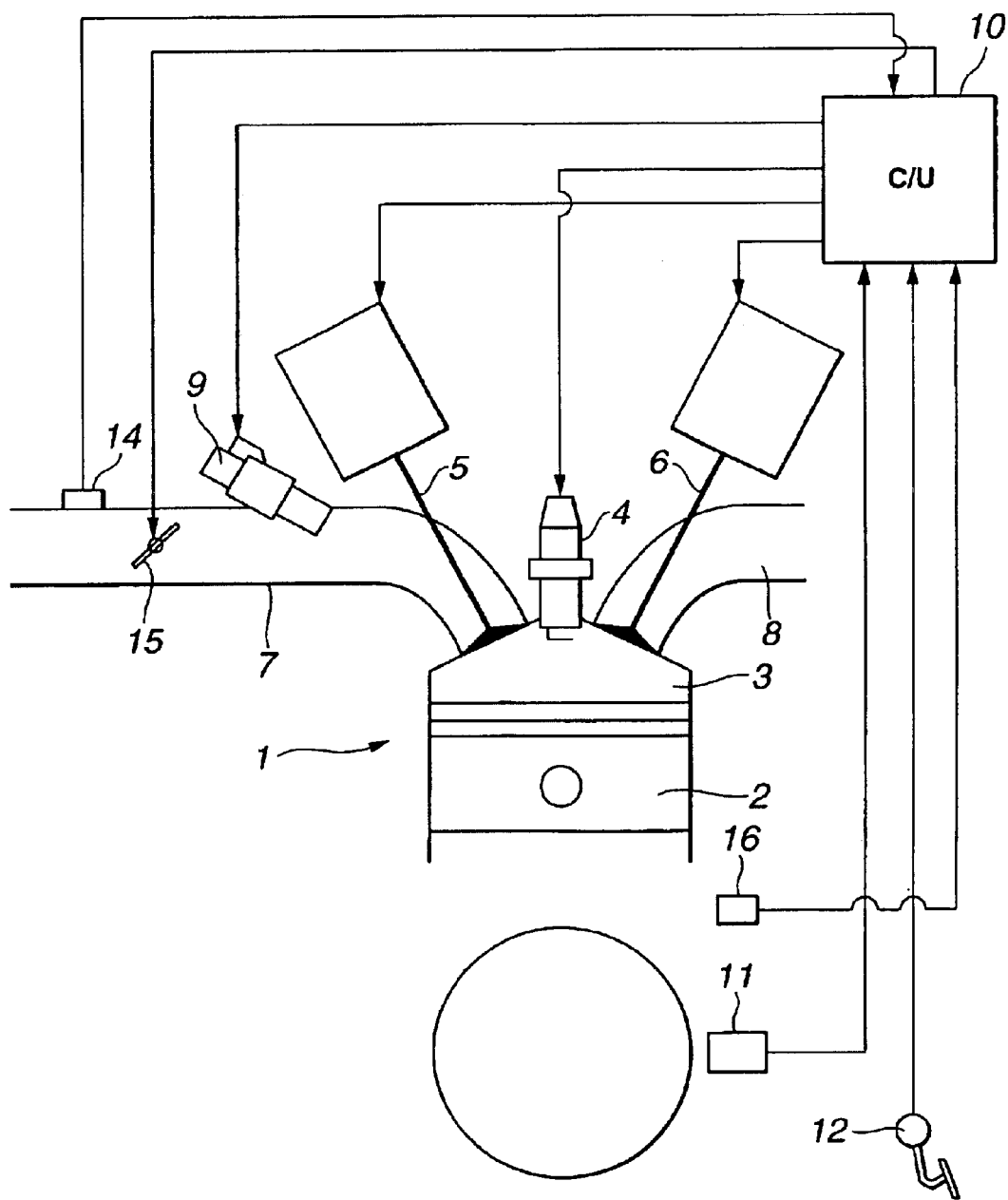
FIG. 1 is a schematic view showing an engine provided with a variable valve timing actuator and a control unit according to a first embodiment of the present invention.

FIG. 1 shows a control system according to one embodiment of the present invention.

As shown in FIG. 1, an engine 1 has a plurality of cylinders each having a combustion chamber 3 defined by a piston 2. Combustion chamber 3 of each cylinder has a spark plug 4, and intake and exhaust valves 5 and 6 of an electromagnetic drive type. An intake passage 7 is for admitting air into each combustion chamber 3, and an exhaust passage 8 conveys the exhaust gases away from engine 1.

Figure 2:
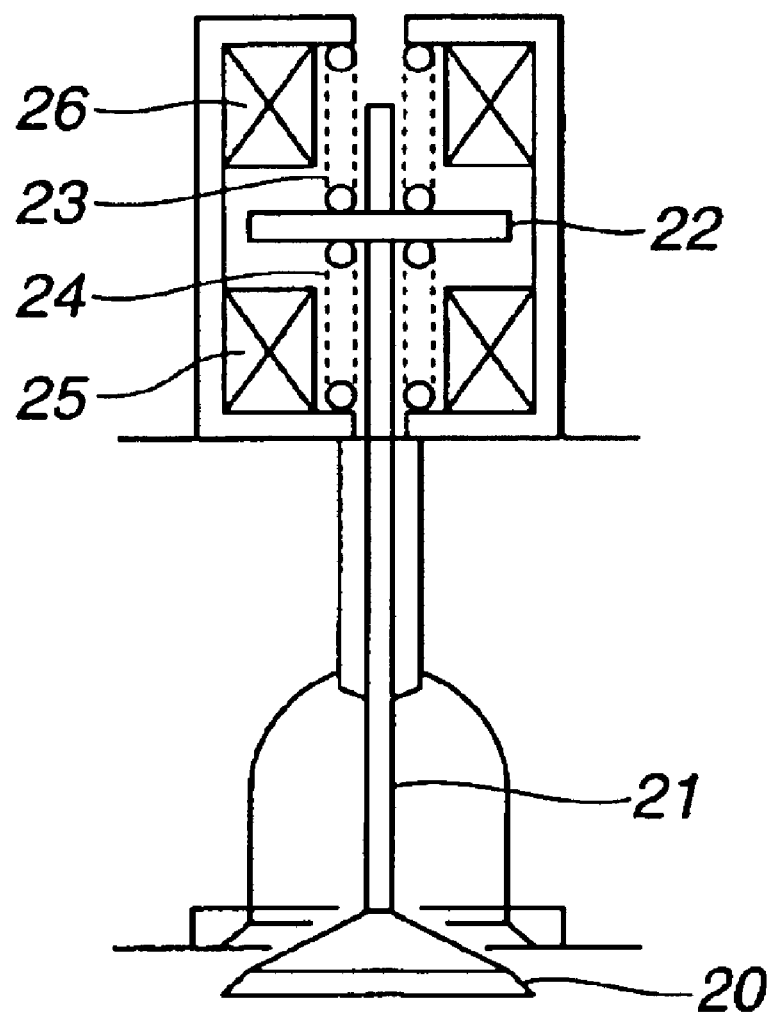
FIG. 2 is a view for illustrating a solenoid drive device for intake or exhaust valve employed in the system of FIG. 1.

FIG. 2 schematically shows a solenoid (electromagnetic) valve actuator for intake or exhaust valves 5 or 6. A valve element 20 is attached to one end of a valve stem 21. A plate-shaped movable member 22 is attached to valve stem 21. Movable member 22 is normally held at a neutral position by springs 23 and 24. An opening solenoid (electromagnetic coil) 25 is disposed below movable member 22, and a closing solenoid (electromagnetic coil) 26 is above movable member 22.

Before a start of engine 1, movable member 22 is operated to oscillate resonantly by energizing opening and closing solenoids 25 and 26 alternately. When the amplitude is increased sufficiently, movable member 22 is attracted and held by one of the solenoids 25 and 26.

The valve is moved from a closed state to an open state by deenergizing upper closing solenoid 26 attracting movable member 22, thereby allowing movable member 22 to move downwards by the biasing force of spring 23, and attracting movable member 22 by energizing lower opening solenoid 25 when movable member 22 approaches lower opening solenoid 25 sufficiently. Thus, valve element 20 is lifted from a valve seat and the valve is opened.

The valve is moved from the open state to the closed state by deenergizing lower opening solenoid 25 attracting movable element 22, thereby allowing movable member 22 to move upwards by the biasing force of spring 24, and attracting movable member 22 by energizing upper closing solenoid 26 when movable member 22 approaches upper closing solenoid 25 sufficiently. Thus, valve element 20 is seated on the valve seat and the valve is closed.

As shown in FIG. 1, there is provided, in intake passage 7, an air flowmeter 14 for sensing an intake air quantity, and a throttle valve 15 whose opening degree is controlled electronically. A solenoid type fuel injector 9 is provided in the intake port for each cylinder.

A control unit (C/U) 10 controls intake and exhaust valves 5 and 6, throttle valve 15, fuel injectors 9 and spark plugs 4, in accordance with input information on engine operating conditions collected by various sensors. A crank angle sensor 11 produces a crank angle signal in synchronism with the engine revolution. An engine speed (rpm) can be determined from the crank angle signal. An accelerator pedal sensor 12 is arranged to sense an accelerator opening (or accelerator pedal depression degree). The signals of these sensors are inputted to control unit 10 serving as a main component of a controller in the control system.

In accordance with the engine operating conditions such as the accelerator opening (degree) and engine speed, this control system controls the actual intake air quantity so as to achieve a target torque mainly by controlling the closing timing of intake valve 5. Moreover, to reduce exhaust emissions, especially the amount of NOx, this control system further controls the closing timing of exhaust valve 6, and the opening timing of intake valve 5 (and the opening timing of exhaust valve 6) to control the internal EGR quantity to an adequate level in accordance with engine operating conditions. In practice, however, the internal EGR quantity is affected not only by these valve timings but other factors as well. Therefore, this control system is arranged to estimate the internal EGR quantity in accordance with engine operating conditions, and to adjust the closing timing of intake valve 5 (of each cylinder, to be exact) in accordance with the estimated internal EGR quantity.

The control system determines the intake air quantity in accordance with sensed values supplied from various sensors, and controls the fuel injection quantity of fuel injector 9 (of each cylinder, to be exact) in accordance with the intake air quantity.

Figure 3:
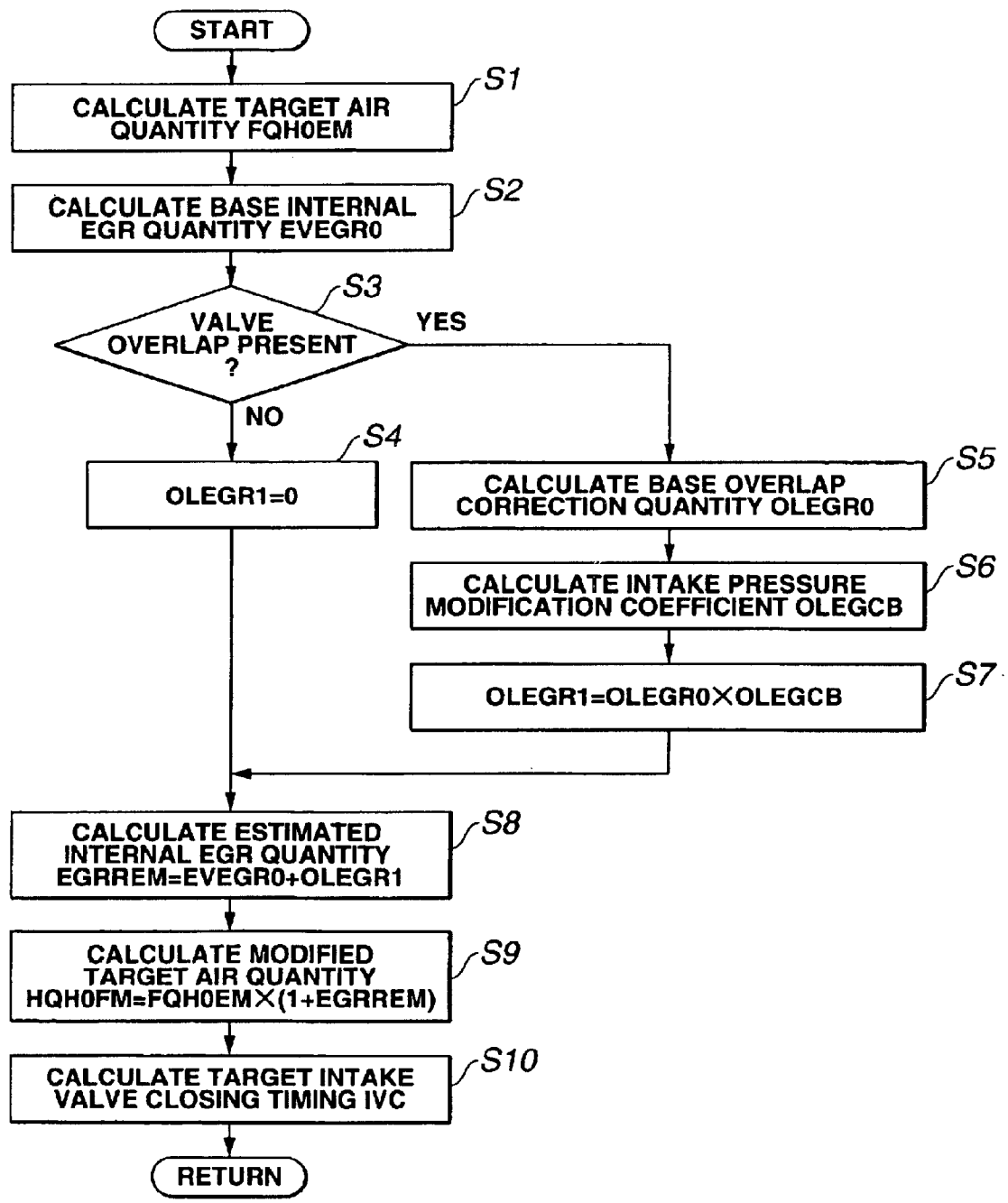
FIG. 3 is a flowchart showing a routine for setting an intake valve closing timing according to the first embodiment.

FIG. 3 shows a main routine for controlling the intake valve closing timing according to the embodiment of the present invention.

Step S1 is a step for reading the accelerator opening sensed by accelerator pedal sensor 12, the engine speed sensed by crank angle sensor 11 etc., and for calculating a target air quantity FQH0EM adequate for a demanded torque.

Step S2 calculates a base internal EGR quantity EVEGR0 representing the internal EGR quantity in the non-overlap state in which there is no valve overlap of intake and exhaust valves. This calculation is carried out by following a subroutine shown in FIG. 4.

At steps S21 and S22, control unit 10 reads an engine speed Ne and a target exhaust valve closing timing EVC. In accordance with the values obtained at steps S21 and S22, control unit 10 calculates base internal EGR quantity EVEGR0, as EGR rate with respect to target air quantity FQH0EM, at step S23, by lookup from a map table prepared from characteristic data as shown in FIG. 7. Base internal EGR quantity EVEGR0 is a quantity of burned gases remaining in a cylinder in the non-overlap state in which there is no overlap of the intake and exhaust valves. Accordingly, as the cylinder volume determined by the piston position at the exhaust valve closure timing EVC becomes smaller, base internal EGR quantity EVEGR0 decreases. Base internal EGR quantity EVEGR0 becomes smallest at top dead center, as shown in FIG. 7. For the same piston position, base internal EGR quantity EVEGR0 differs between the condition before top dead center (BTDC) and the condition after top dead center (ATDC). When EVC is before top dead center, the exhaust valve is closed in the state the residual gas mixture is somewhat compressed. When EVC is after top dead center, on the other hand, the exhaust valve is closed in the state pulling back the exhaust gases discharged into the exhaust passage, and, due to a delay in return of the exhaust gases, the residual gas quantity, that is the internal EGR quantity, becomes smaller. Moreover, this tendency is attributable to the inertia, and affected by engine speed Ne, too. As engine speed Ne becomes higher, the inertia is increased, and hence the influence exerted on the internal EGR quantity is increased. When EVC is after TDC, the exhaust gas flow changes and hence the influence of the inertia is great, so that the decrease of the internal EGR quantity due to an increase of engine speed Ne becomes greater. At positions away from top dead center, the piston speed is higher, and the amount of change of the internal EGR quantity with respect to a change in engine speed Ne increases.

Thus, base EGR quantity EVEGR0 is increased as the extent of separation (such as an angular distance in terms of degrees in crank shaft rotation) of EVC from exhaust TDC (that is, TDC on the exhaust stroke) becomes larger. Base EGR quantity EVEGR0 is increased with increase in engine speed Ne on the BTDC side, and base EGR quantity EVEGR0 is decreased with increase in engine speed Ne on the ATDC side. The rate of decrease of base EGR quantity EVEGR0 with respect to increase in engine speed Ne on the ATDC side is greater than the rate of increase of base EGR quantity EVEGR0 with respect to increase in engine speed Ne on the BTDC side.

Reverting to FIG. 3, step S3 is for examining whether there is a valve overlap between target opening timing IVO of intake valve 5 and target closing timing EVC of exhaust valve 6.

If there is no overlap, then control unit 10 proceeds to step S4, and sets an overlap correction quantity OLEGR1 for correcting the internal EGR quantity, to zero (OLEGR1=0). Consequently, estimated internal EGR quantity EGRREM is set equal to base internal EGR quantity EVRGR0 (EGRREM=EVRGR0) at a next step S8.

Figure 5:
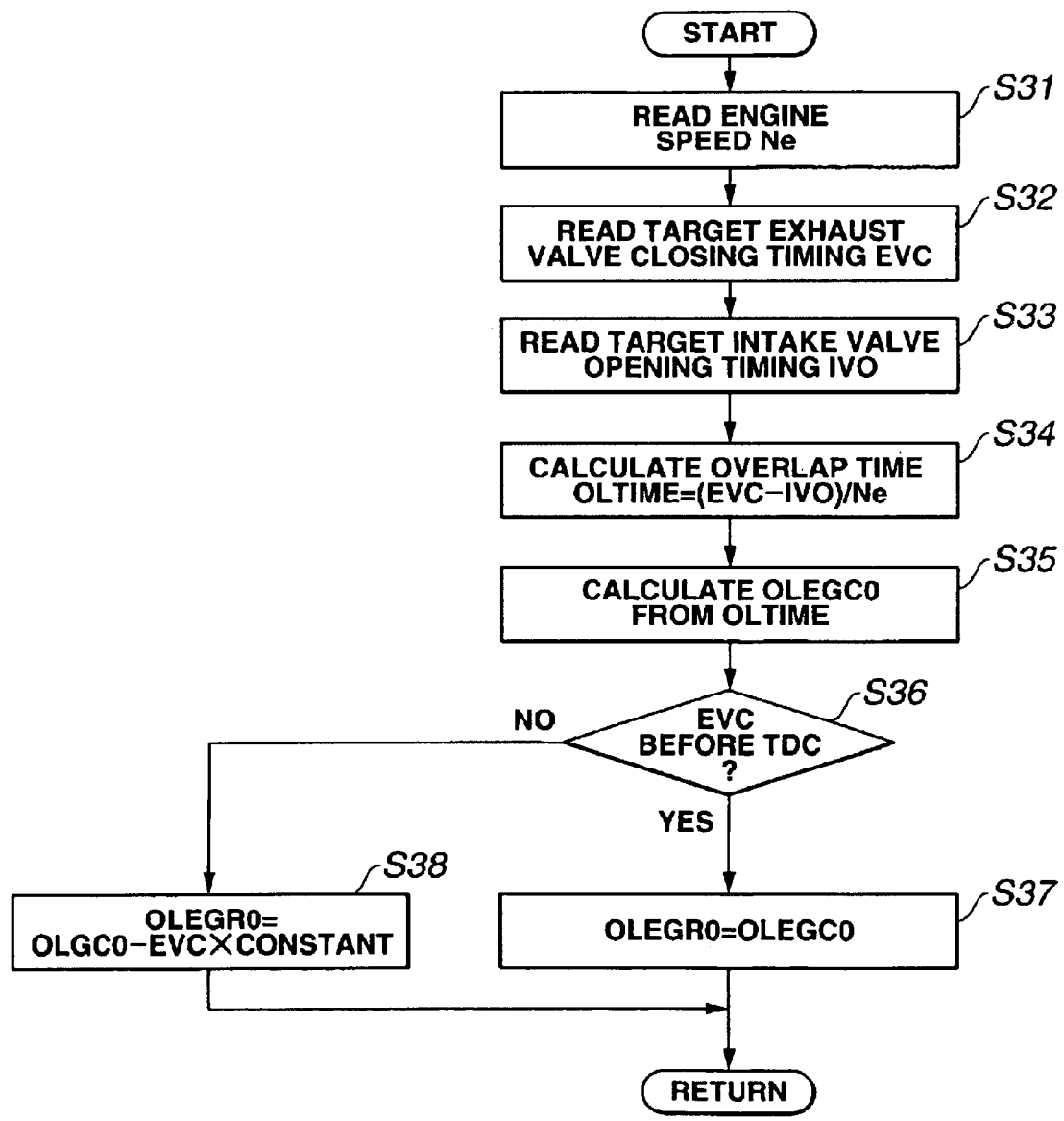
FIG. 5 is a flowchart showing a subroutine for determining an overlap correction quantity used to modify the base internal EGR quantity.

If there is a valve overlap, control unit 10 proceeds from step S3 to step S5, and calculates a base overlap correction quantity OLEGR0 by a subroutine shown in FIG. 5.

At steps S31, S32 and S33, control unit 10 reads engine speed Ne, target exhaust valve closing timing EVC of exhaust valve 6 and intake valve opening timing IVO of intake valve 5. At step S34, control unit 10 converts a valve overlap quantity (expressed in degrees of crankshaft rotation) to a valve overlap time OLTIME by using the input values of Ne, EVC and IVO according to the following equation.

$$OLTIME = (EVC-IVO)/Ne$$

Then, at step S35, control unit 10 determines an intermediate quantity OLEGC0 from valve overlap time OLTIME by lookup from a map table. Thus, step 35 determines a value of quantity (intermediate quantity) OLEGC0 corresponding to the current value of valve overlap time OLTIME.

Figure 10:
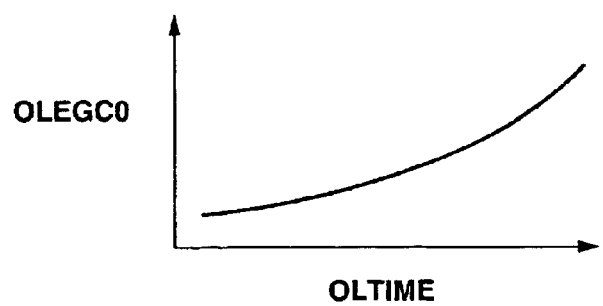
FIG. 10 is a graph showing a characteristic of a quantity OLEGC0 with respect to a valve overlap time OLTIME, which can be used in the subroutine of FIG. 5.

In this example, the intermediate quantity OLEGC0 is increased monotonically with increase in valve overlap time OLTIME, as shown in FIG. 10.

At step S36, control unit 10 examines whether exhaust valve closing timing EVC is on the BTDC side or on the ATDC side.

When EVC is before TDC, control unit 10 proceeds from step S36 to step S37, and sets quantity OLEGC0 determined at step S35, as base overlap (increase) correction quantity OLEGR0 directly without modification (OLEGR0=OLEGC0).

When EVC is after TDC, control unit 12 proceeds from step S36 to step S38, and determines base overlap (increase) correction quantity OLEGR0 by modifying the obtained value of OLEGC0 in accordance with target closing timing EVC by the following equation.

$$OLEGR0 = OLEGC0 - EVC(\text{retard quantity after } TDC) \times \text{constant}$$

Figure 8:
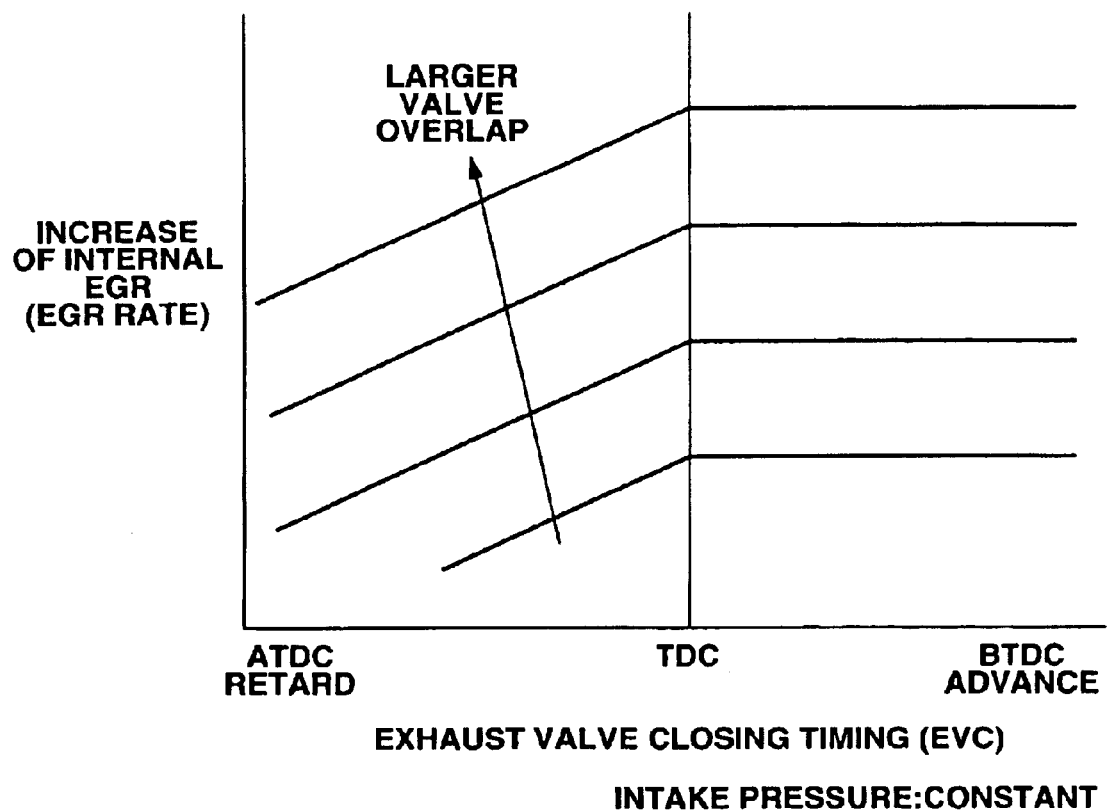
FIG. 8 is a graph showing a characteristic of the overlap correction quantity.

The variation quantity (or increase quantity) of the internal EGR between the base internal EGR quantity in the non-overlap state and the internal EGR quantity in the valve overlap state varies, even for the same valve overlap quantity (or time), since the influence of back-flow differs in dependence on exhaust valve closing timing EVC. FIG. 8 shows variation of the increase quantity of the internal EGR quantity with respect to EVC for different values of the overlap quantity (time) on the condition that engine speed Ne is constant and the intake pressure is constant.

When EVC is judged to be before TDC, the internal EGR increase quantity (OLEGR0) is held approximately constant irrespective of changes in EVC, as shown in FIG. 8. In the case of EVC being before TDC, burned gases in the cylinder tend to be sucked back into the intake port on the lower pressure side during the valve overlap, rather than being expelled into the exhaust port, and the backward flow becomes dominant. Then, the burned gases of the back-flow to the intake port are sucked again into the cylinder in the subsequent intake stroke, so that the EGR rate is approximately constant. Therefore, the correction by EVC (the advance quantity before top dead center) is not performed at step S37.

When EVC is after TDC, the quantity of exhaust backflow into the intake port decreases because of downward movement of the piston during the valve overlap. Moreover, as EVC is shifted away from top dead center, the intake negative pressure in the cylinder increase, and the pressure difference from the intake negative pressure in the intake port decreases. Therefore, the tendency to the exhaust backflow decreases. In the overlap state, as compared to the non-overlap state, the quantity of return flow of exhaust gases from the exhaust port into the cylinder increases (, so that the scavenging efficiency decreases) by transmission of the intake negative pressure into the cylinder through the opening of the intake valve, and the internal EGR quantity increases accordingly. However, this increase quantity in the internal EGR quantity is large when the overlap is around top dead center, but this increase quantity decreases as the overlap shifts away from TDC. When the overlap is near top dead center, the influence from the intake negative pressure on the condition in the cylinder is great as compared with the non-overlap state where the intake valve is not opened, and therefore, the internal EGR increase quantity due to the return of the exhaust gases is large. When, on the other hand, the overlap is away from TDC, the difference between the intake negative pressure increased by the downward movement of the piston in the non-overlap state where the intake valve held closed during this period, and the intake negative pressure transmitted from the intake port into the cylinder during the overlap becomes smaller, and hence the difference in the exhaust return flow quantity between the overlap state and the non-overlap state becomes smaller. Namely, the increase in the internal EGR quantity due to the return-flow of the exhaust gases during the overlap decreases as the overlap (or EVC) shifts away from TDC.

For the reasons above, when EVC is after TDC, the increase (OLEGR0) of the internal EGR quantity due to overlap is decreased as EVC shifts away from TDC, as shown in FIG. 8.

Therefore, step 38 performs the subtraction by the subtrahend proportional to EVC (the retard quantity after TDC).

Reverting to FIG. 3, step S6 calculates an intake pressure modification coefficient OLEGCB for modifying the thus-calculated base overlap correction quantity OLEGR0 in accordance with the intake pressure (boost pressure).

Base overlap correction quantity OLEGR0 is calculated as an increase quantity of the internal EGR quantity due to a valve overlap under the condition where the intake pressure is constant (−50 mmHg). Even for the same overlap quantity (or time) and EVC, the exhaust back-flow quantity is varied by a variation in the intake pressure. This is taken into account by modification based on the intake pressure. In the case where there is provided no throttle valve, and the intake pressure is held approximately constant at the atmospheric pressure, the modification can be omitted. However, the modification based on the intake pressure is needed or desired when the intake pressure is controlled at a predetermined level by throttling the opening degree of throttle valve 15, to supply the vacuum pressure for braking, or for the suction of evaporative fuel vapor and blow-by gas into the intake system, and the intake air quantity is controlled by controlling the intake valve closing timing in consideration of the intake pressure.

Intake pressure modification coefficient OLEGCB is calculated by a subroutine shown in FIG. 6.

Figure 9:
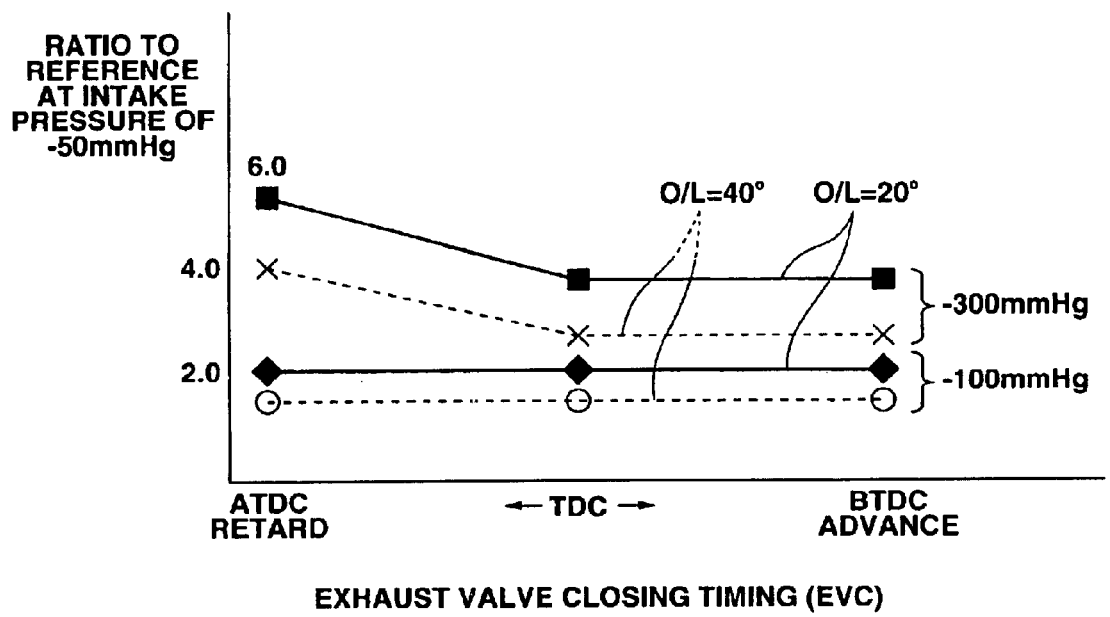
FIG. 9 is a graph for illustrating influence of the intake pressure on the base correction quantity.

Step S41 reads the target intake pressure calculated by the above-mentioned intake pressure control process of controlling the intake pressure by controlling the throttle opening degree. Step S42 reads target closing timing EVC of exhaust valve 6. In accordance with the values of these input quantities, step S43 obtains a value of intake pressure modification coefficient OLEGCB by lookup from a map table prepared on the basis of characteristic data, as shown in FIG. 9. FIG. 9 shows a magnification (or multiplying factor) which is a ratio of the internal EGR increase quantity under the condition of intake pressure (negative pressure) being equal to −100 mmHg or −300 mmHg to the internal EGR increase quantity under the condition of intake pressure being equal to −50 mmHg. For each of the intake pressure conditions of −100 mmHg and −300 mmHg, there are shown two characteristic lines in the two cases of overlap quantity (crank angle) being equal 20° and 40°. As shown in FIG. 9, at an intake pressure of −100 mmHg, the magnification remains constant at about 2 irrespective of variation in EVC (the middle of the valve overlap period). At an intake pressure of −300 mmHg, on the other hand, the magnification is held constant at about 3~4 when EVC is before TDC, and the magnification is increased linearly with increase in the extent of separation of EVC from TDC when EVC is after TDC. When EVC is after TDC at a constant intake pressure (−50 mmHg), as mentioned before, the pressure difference in the cylinder due to the existence and nonexistence of a valve overlap becomes smaller as EVC is shifted away from TDC, so that the increase quantity of the exhaust back-flow quantity tends to decrease. However, when the intake negative pressure increases to −300 mmHg, the pressure difference in the cylinder due to the existence and nonexistence of a valve overlap becomes greater, so that the increase quantity is held at a larger level, and hence the magnification is increased as compared to the example of −50 mmHg.

Thus, the control system of this example increases the modification quantity OLEGCB as an absolute value of the intake pressure increases on the negative side, and increases the modification quantity OLEGCB in accordance with the retard quantity or angle of the exhaust valve closing timing EVC from the exhaust top dead center when the exhaust valve closing timing EVC is after the exhaust top dead center and the absolute value of the intake pressure is higher than a predetermined level which, in this example, is about −100 mmHg as seen from FIG. 9.

Reverting to FIG. 3, step S7 calculates a final overlap correction quantity OLEGR1 by multiplying base correction quantity OLEGR0 calculated at step S5 by intake pressure modification coefficient OLEGCB calculated at step S6 (OLEGR1=OLEGR0×OLEGCB).

Step S8 calculates estimated internal EGR quantity EGRREM by addition of overlap correction quantity OLEGR1 calculated at step S7, to base internal EGR quantity EVEGR0 calculated at step S2. Thus, the internal EGR quantity is estimated by adding the calculated overlap increase correction quantity OLEGR1 to base internal EGR quantity EVEGR0.

$$EGRREM = EVEGR0 + OLEGR1$$

Step S9 calculates a modified target air quantity HQH0FM by modifying target air quantity FQH0EM calculated at step S1, in accordance with estimated internal EGR quantity EGRREM.

$$HQH0FM = FQH0EM \times (1 + EGRREM)$$

This modification is not intended to change the target air quantity per se, but it is a modification for convenience to take account of changes in the intake valve closing timing required to obtain the target air quantity (the quantity of fresh air) caused by the internal EGR quantity. Thus, the target air quantity is calculated as a total amount of gases in the cylinder by adding the quantity of the internal EGR gas to the target air quantity.

Step S10 calculates target closing timing IVC of intake valve 5 in accordance with modified target air quantity HQH0FM.

Therefore, the control unit delivers a valve control signal corresponding to target intake valve closing timing IVC, to the above-mentioned electromagnetic drive unit, and thereby controls intake valve 5 so that intake valve 5 is closed at target intake valve closing timing IVC.

This control system estimates the internal EGR quantity in accordance with engine operating conditions accurately by taking account of valve overlap period, and controls the actual intake valve closing timing by modifying the target intake valve closing timing in accordance with the estimated internal EGR quantity. Therefore, the control system can obtain a quantity of fresh air suited to the target intake air quantity and control the torque accurately.

Figure 11:
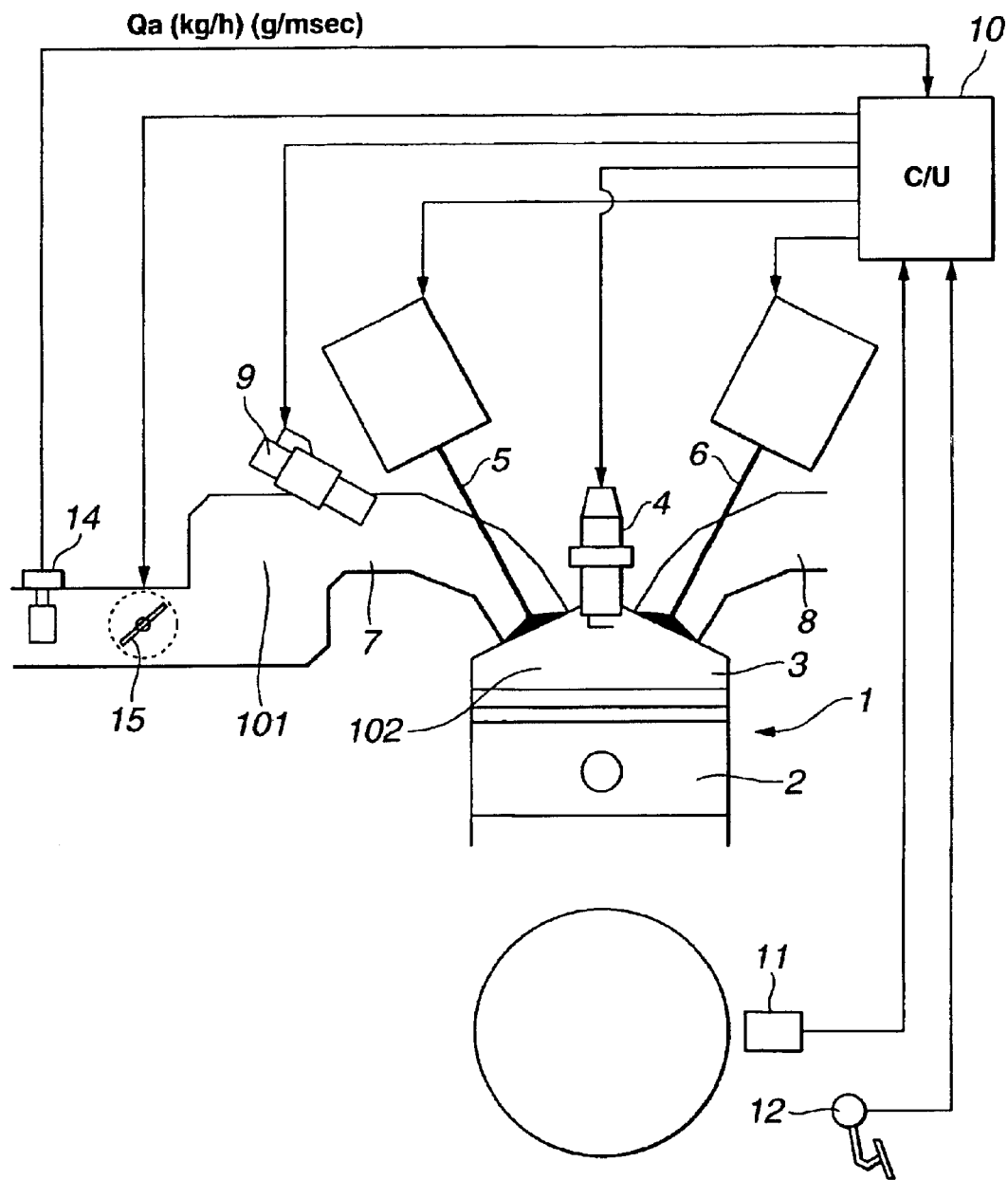
FIG. 11 is a schematic view similar to FIG. 1, but showing an engine system according to a second embodiment of the present invention.
Figure 12:
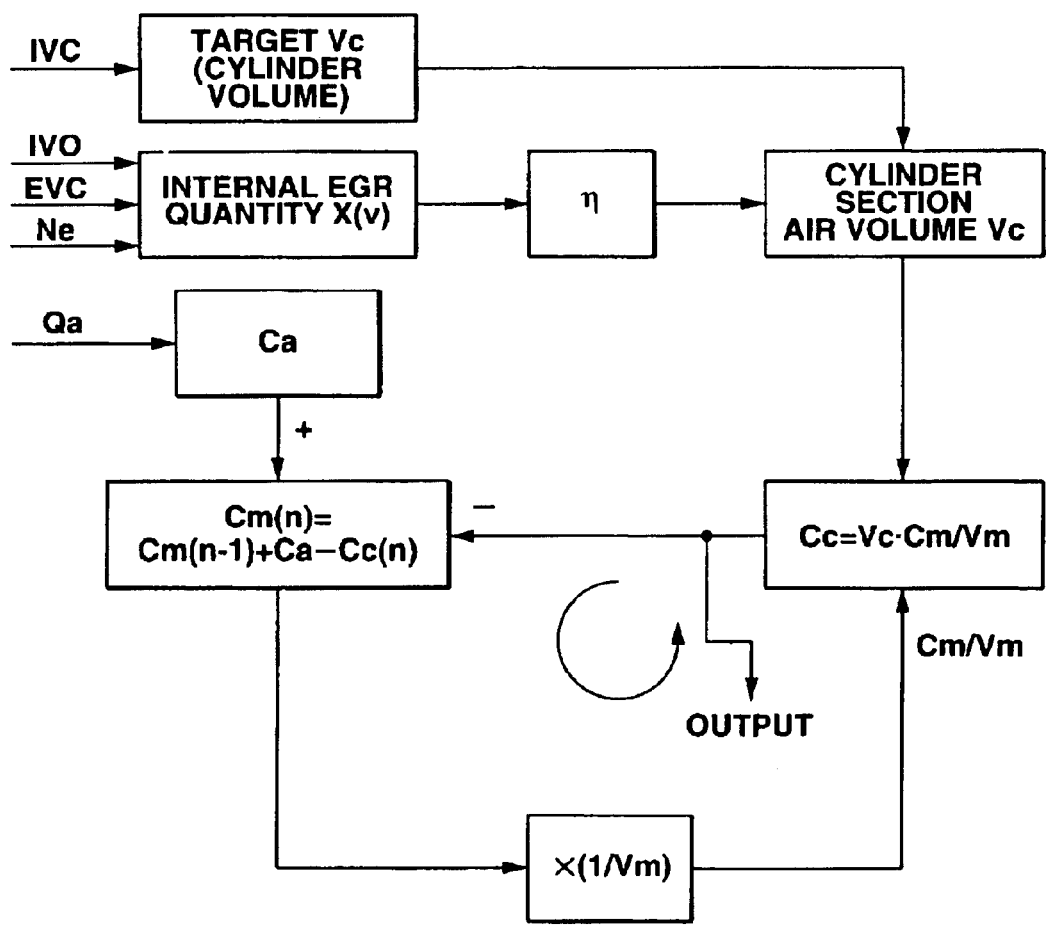
FIG. 12 is a block diagram showing an engine cylinder intake air quantity estimating system according to the second embodiment of the present invention.

FIGS. 11~17 shows a second embodiment of the present invention. FIG. 12 shows an engine cylinder intake air quantity estimating system according to the second embodiment. This estimating system is designed to accurately estimate an engine cylinder intake air quantity based on the internal EGR quantity calculated according to the estimating method of steps S1~S8 shown in FIG. 3. An engine system shown in FIG. 11 is substantially identical to the engine system shown in FIG. 1, so that repetitive explanation is omitted. The fuel injection quantity by the fuel injector 9 is controlled basically in accordance with the intake air quantity (mass flow rate) Qa measured by air flowmeter 14, so as to achieve a desired air fuel ratio with respect to a cylinder intake air quantity (the mass of air in cylinder section) Cc calculated as explained below.

The calculation of the cylinder intake air quantity Cc for engine control such as fuel injection quantity control is shown in a block diagram of FIG. 12, and flowcharts of FIGS. 13~17.

In this example, intake air quantity (mass flow rate) Qa (Kg/h) measured by air flowmeter 14 shown in FIG. 11 is multiplied by $1/3600$ and treated as (g/msec).

In an intake manifold section 101 shown in FIG. 11, a pressure is Pm (Pa), a volume is Vm (m$^3$, constant), an air mass quantity (the mass of air) is Cm (g), and a temperature is Tm (K). In an engine cylinder section 102, a pressure is PC (Pa), a volume is Vs. (m$^3$), an air mass quantity (the mass of air) is Cc (g), and a temperature is Tc (K). A cylinder fresh air rate is η (%). In this example, it is assumed that Pm=PC, and Tm=Tc. Thus, the pressure and temperature remain unchanged between intake manifold section 101 and engine cylinder section 102.

Figure 13:
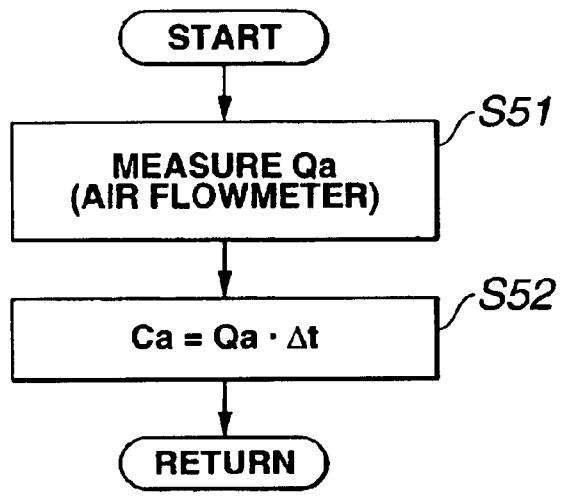
FIG. 13 is a flowchart showing a routine for calculating a manifold section inflow air quantity, performed in the system of FIG. 12.

FIG. 13 shows a routine for calculating an intake manifold section inflow air quantity, performed at regular time intervals of a predetermined time Δt (1 msec, in this example).

Step S51 is a step to measure the intake air quantity Qa (mass flow rate; g/msec) from the output of air flowmeter 9.

Step S52 is to calculate a manifold inflow air quantity Ca (the mass (g) of air flowing into intake manifold section 101 during each predetermined time period Δt by integration of intake air quantity Qa. In this example;

$$Ca = Qa \cdot \Delta t$$

Figure 14:
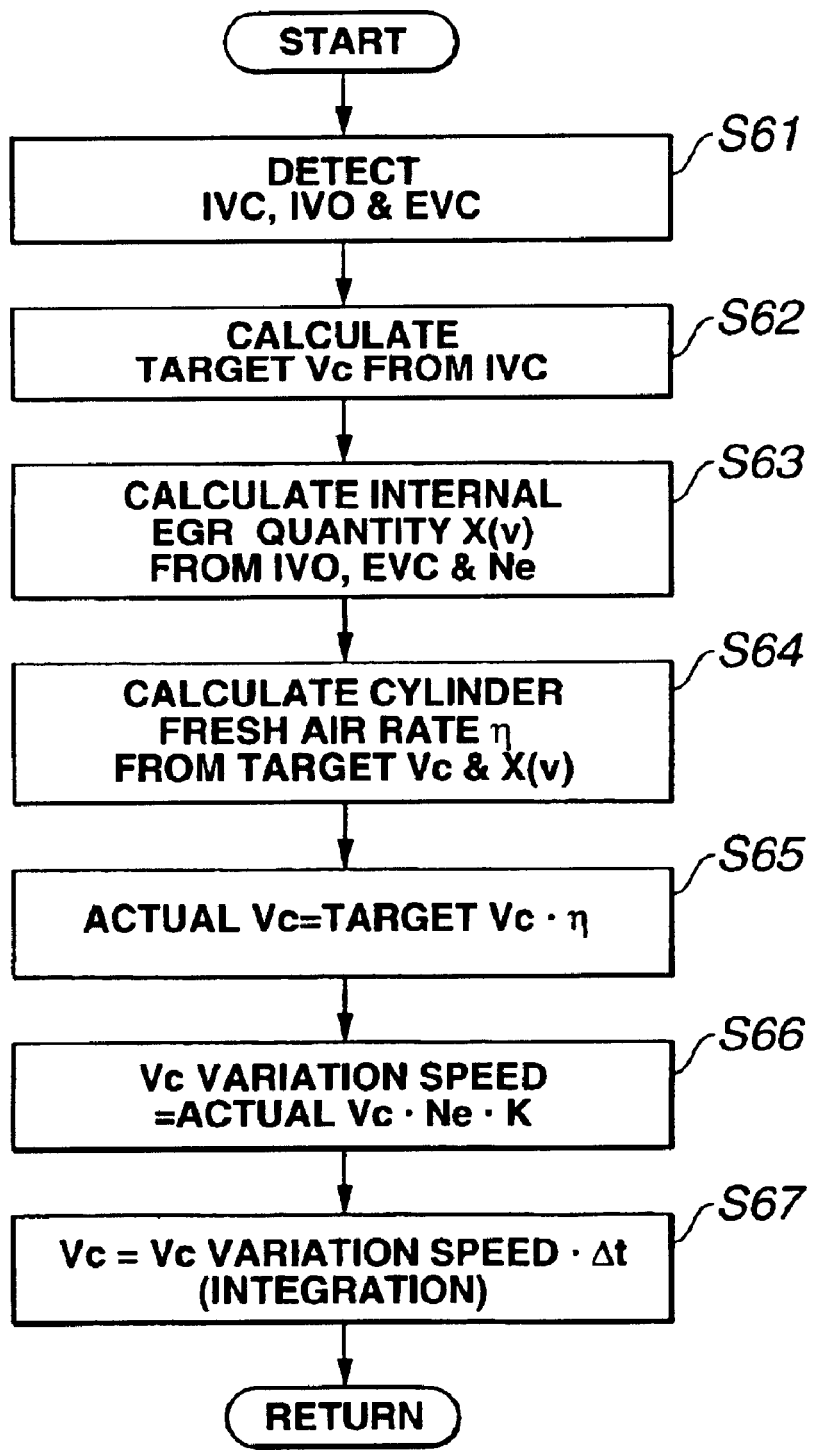
FIG. 14 is a flowchart showing a routine for calculating a cylinder volume, performed in the system of FIG. 12.

FIG. 14 shows a routine for calculating a cylinder section air volume quantity (the volume of air in cylinder section 102), performed at regular time intervals of the predetermined time Δt.

Step S61 detects a closing timing IVC of intake valve 5, an opening timing IVO of intake valve 5 and a closing timing EVC of exhaust valve 6. It is optional to employ lift sensors for directly sensing the valve opening or closing timing for intake and exhaust valves 5 and 6. However, it is possible to simplify the estimating system by employing target valve timings (command values) used in control unit 10 for the engine control as in the first embodiment.

Step S62 uses the intake valve closing timing IVC and calculates a cylinder volume at that time from the intake valve closing timing IVC of intake valve 5. The thus-calculated cylinder volume is treated as a target Vs. (m$^3$).

Step S63 calculates an estimated internal EGR quantity X(v) (corresponding to the before-mentioned estimated internal EGR quantity EGRREM) in accordance with intake valve opening timing IVO of intake valve 5, exhaust valve closing timing EVC of exhaust valve 6 and engine revolution speed Ne, according to the estimating method explained in the first embodiment.

Step S64 calculates the cylinder fresh air rate η (%) from the target Vs. (cylinder volume) and a residual gas quantity which is equal to the estimated internal EGR quantity X(v), by using the following equation.

$$\eta = (\text{Cylinder volume } Vc - \text{Residual gas quantity}) / \text{Cylinder volume } Vc$$

That is, the overlap quantity is determined by intake valve opening timing IVO and exhaust valve closing timing EVC, and the residual gas quantity (i.e., the internal EGR quantity) increases as the overlap quantity increases. Therefore, this estimating system calculates the cylinder fresh air rate η according to the above equation based on the overlap quantity. In an engine of a variable valve timing type, the internal EGR quantity is freely controlled by control of the valve overlap quantity, so that there is provided no EGR apparatus (for external EGR) in general. When an EGR apparatus is provided for external EGR, the residual gas quantity is set equal to a sum of the internal EGR quantity and an external EGR quantity of the EGR apparatus, and the cylinder fresh air rate η is calculated by using the sum of the internal and external EGR quantities.

Step S65 calculates an actual Vs. corresponding to a target air quantity, by multiplying the target Vs. (intake volume) by cylinder fresh air rate η. That is;

$$\text{Actual } Vc(m^3) = Vc \cdot \eta$$

This actual Vc (m$^3$) corresponds to the cylinder intake air quantity (volume). If the external EGR quantity is equal to zero, it is possible to determine the actual Vc by subtracting the internal EGR quantity from the intake volume Vc.

Step S66 calculates a Vc variation speed (volume flow rate; m$^3$/msec) by multiplying the actual Vc (m$^3$) by engine speed Ne (rpm).

$$Vc \text{ variation speed} = \text{actual } Vc \cdot Ne \cdot K$$

In this equation, K is a constant for adjusting units, and $K=(1/30) \times (1/1000)$ where $1/30$ is for conversion from Ne (rpm) to Ne (180 deg/sec), and $1/1000$ is for conversion from Vc (m$^3$/sec) to Vc (m$^3$/msec).

In the case where part of cylinders are cut off from operation, the following equation is used;

$$Vc \text{ variation speed} = \text{actual } Vc \cdot Ne \cdot K \cdot n/N$$

In this equation, n/N is an operating ratio, N is the number of the cylinders, and n is the number of cylinders held in operation. When, for example, one cylinder is cut off from operation in a four cylinder engine, n/N is equal to ¾. When the operation of a specified cylinder is cut off, the fuel is cut off in the state in which the intake and exhaust valves of that cylinder are held in the fully closed state.

Step S67 calculates a cylinder section air volume quantity Vc which is the quantity of air inducted into the cylinder section per unit time (1 msec), by integration of the Vc variation speed (or the rate of change of Vc). In this example, cylinder section air volume quantity Vc (m³)=Vc variation speed·Δt.

Figure 15:
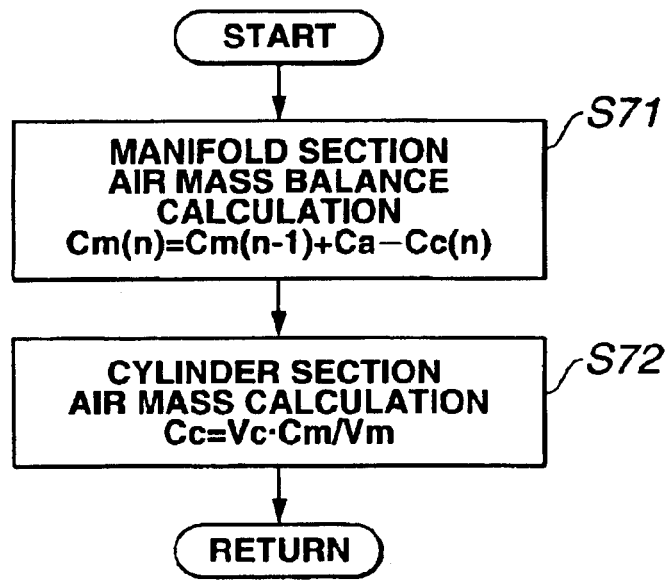
FIG. 15 is a flowchart showing a routine for continuous calculation (manifold section intake air balance and cylinder intake air quantity), performed in the system of FIG. 12.

FIG. 15 shows a routine for continuous (or iterative) calculation (intake manifold section intake air balance calculation and cylinder section air mass quantity calculation), performed repeatedly at regular time intervals of the predetermined time Δt.

Step S71 is a step for manifold section intake air balance calculation (to determine a manifold section air mass quantity Cm). Step S71 calculates the cylinder section air mass quantity Cm(n) (g) from a previous manifold section air mass quantity Cm(n−1) which a previous value of the manifold section air mass quantity Cm, by addition of the manifold inflow air mass quantity Ca (=Qa·Δt) determined in the routine of FIG. 13 and subtraction of the cylinder section air mass quantity Cc(n) which is the cylinder intake air quantity of air flowing out of manifold section 101 into cylinder section 102. That is;

$$Cm(n)=Cm(n-1)+Ca-Cc(n)$$

Step S71 uses, as Cc(n) in this equation, a value of Cc calculated at next step S72 in a previous execution of this routine.

Step S72 is a step for calculation of the cylinder intake air quantity (cylinder section air mass quantity Cc). Step S72 calculates the cylinder section air mass quantity Cc (g) from the cylinder section air volume quantity Vc determined by the routine of FIG. 14, by multiplication by manifold section air mass quantity Cm and division by manifold section volume Vm (constant value). That is;

$$Cc=Vc \cdot Cm/Vm \qquad (1)$$

This equation (1) is obtained as follows.

Rearrangement of an equation of state of gas P·V=C·R·T provides C=P·V/(R·T). Therefore, as to the cylinder section;

$$Cc=PC \cdot Vc/(R \cdot Tc) \qquad (2)$$

Assuming PC=Pm and Tc=Tm, $$Cc=Pm \cdot Vc/(R \cdot Tm) \qquad (3)$$

On the other hand, rearrangement of the equation of state of gas P·V=C·R·T provides P/(R·T)=C/V. Therefore, as to the manifold section;

$$Pm/(R \cdot Tm)=Cm/Vm \qquad (4)$$

Substitution of equation (4) into equation (3) yields;

$$Cc=Vc \cdot [Pm/(R \cdot Tm)]=Vc \cdot [Cm/Vm]$$

Thus, the equation (1) is obtained.

In this way, the estimating system according to the second embodiment can determine the cylinder section air mass quantity Cc (g) which is the cylinder intake air quantity, by performing steps S71 and 72 repeatedly as shown by a circular arrow indicating continuous calculation in FIG. 12, and output the thus-determined cylinder section air mass quantity Cc (g) as an output signal. The order of steps S71 and S72 can be reversed. In this case, the estimating system performs step S72 first, and then performs step S71 after step S72.

Figure 16:
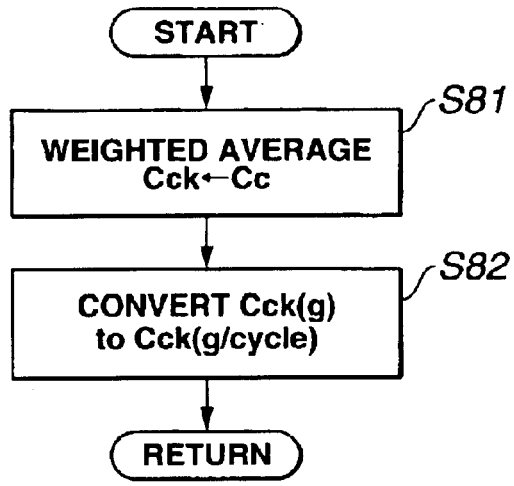
FIG. 16 is a flowchart showing a routine for after treatment, performed in the system of FIG. 11.

FIG. 16 shows an aftertreatment routine.

Step S81 performs a process of weighted average on the cylinder section air mass quantity Cc (g), expressed by the following equation, and thereby determines Cck (g).

$$Cck=Cck \times (1-M)+Cc \times M$$

where M is a weight constant factor, and 0<M<1.

Step S82 converts the thus-determined cylinder section air mass quantity Cck (g) to a per-cycle cylinder section air mass quantity Cck (g/cycle) by using engine speed Ne (rpm) to adapt the air mass quantity Cck to the cycle period.

$$Cck(g/cycle)=Cck/(120/Ne)$$

The per-cycle cylinder section air mass quantity Cck (g/cycle) is a cylinder air mass quantity per cycle (2 revolutions=720 deg).

Figure 17:
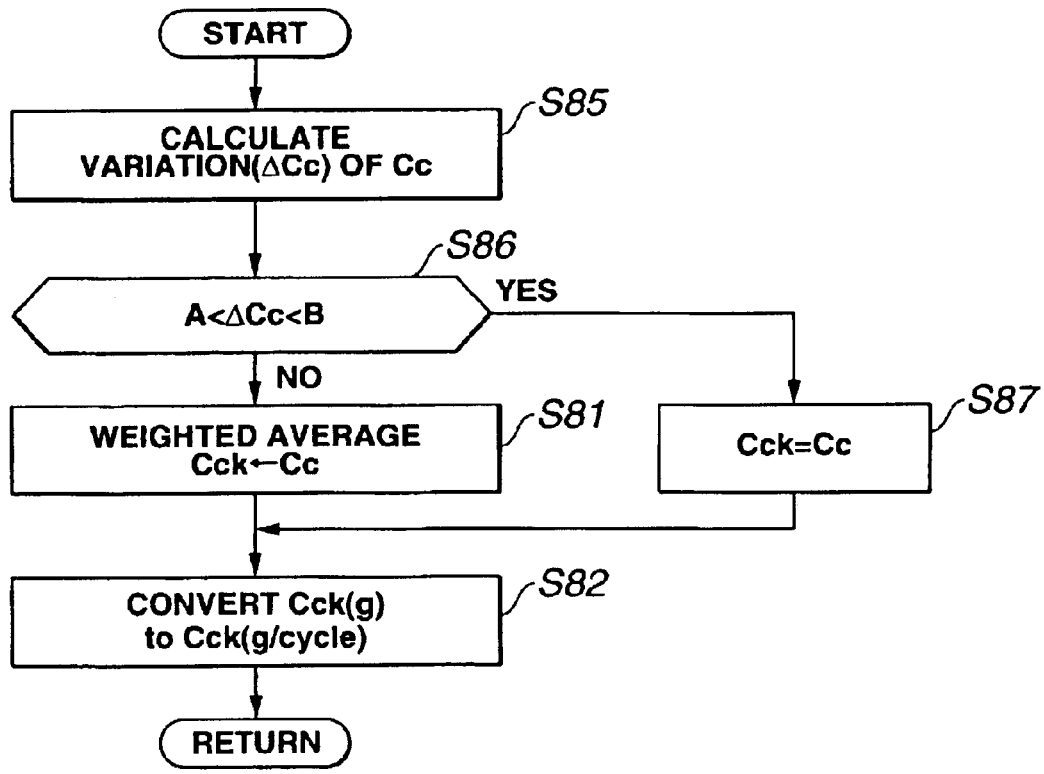
FIG. 17 is a flowchart showing a routine in another example for after treatment.

FIG. 17 shows a variation of aftertreatment routine. It is possible to achieve the control accuracy and control response simultaneously by performing this weight averaging operation only when the pulsation of the intake air flow is strong as in a situation of wide open throttle or full throttle where the throttle valve is wide or fully open. Therefore, in the routine of FIG. 17, step S85 calculates a variation quantity ΔCc of the cylinder section air mass quantity Cc(g), and next step S86 checks whether the variation quantity ΔCc is within a predetermined region. If the variation quantity ΔCc is greater than a first value A and smaller than a second value B, there is no need for the weight averaging operation, and step S87 sets Cck (g) equal to Cc (g) (Cck=Cc). After step S87, step S82 converts the cylinder section air mass quantity Cck (g) to the per-cycle cylinder section air mass quantity Cck g/cycle) as in step S82 of FIG. 16. If the variation quantity ΔCc is outside the predetermined region, step S81 performs the weight averaging operation as in step S81 of FIG. 16, and the routine proceeds to step S82 as in FIG. 16.

In this way, the cylinder intake air estimating system according to the second embodiment can calculate the cylinder intake air quantity (cylinder section air mass quantity Cc or Cck) accurately by using the estimated internal EGR quantity in the continuous calculation of manifold section air mass balance calculation and cylinder section air mass calculation. Therefore, this estimating system can improve the calculation accuracy or estimation accuracy significantly in determining the cylinder intake air quantity in an engine of variable valve timing control type. As a result, a fuel injection quantity control system can improve the control accuracy of the air fuel ratio and thereby improve the exhaust performance and drivability significantly.

This estimating method requires no pressure sensors and no temperature sensors. Therefore, the cylinder intake air quantity is estimated accurately without increasing the const.

Figure 18:
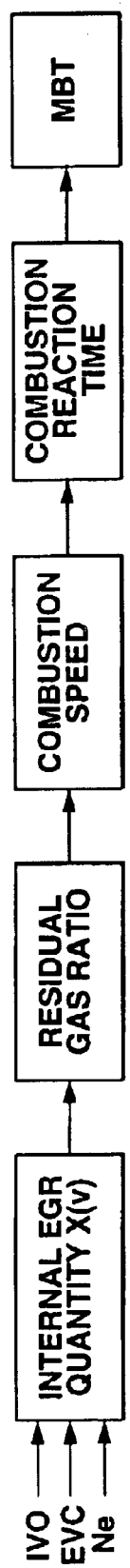
FIG. 18 is a block diagram showing an ignition timing control system according to a third embodiment of the present invention.

FIG. 18 is a control block diagram showing a third embodiment. A system shown in FIG. 18 is a control system for estimating an internal EGR quantity and controlling an ignition timing of an engine for a vehicle by using the result of the estimation.

A first section of the ignition timing control system of FIG. 18 is an internal EGR quantity calculating section for calculating an estimated internal EGR quantity X(v) in accordance with exhaust valve closing timing EVC, intake valve opening timing IVO and engine revolution speed Ne in the same manner as in the preceding embodiments.

A second section is a residual gas ratio calculating section for calculating a residual gas ratio ξ by dividing a residual gas (mass) quantity X(g) by a cylinder total gas (mass) quantity Vc (g) (ξ=X(g)/Vc(g)). The residual gas (mass) quantity X(g) is determined by conversion from a residual gas (volume) quantity by using the density ρ of the EGR gas. The residual gas (volume) quantity is equal to a sum of the estimated internal EGR quantity and the external EGR quantity when the external EGR is employed. The cylinder total gas (mass) quantity is determined by adding the cylinder section air (mass) quantity Cc(g) calculated as in the second embodiment, to the residual gas (mass) quantity X(g).

A third section is a combustion speed calculating section for calculating a combustion speed (or burning velocity) Bv in accordance with the residual gas ratio $\xi$. The combustion speed Bv decreases as the residual gas ratio $\xi$ increases.

A fourth section is a combustion reaction time calculating section for calculating a combustion reaction time Bt in accordance with the combustion speed Bv. The combustion reaction time Bt is a time from the ignition timing until a peak of the combustion pressure is reached.

A fifth section is a MBT calculating section for calculating MBT (maximum torque producing ignition timing) in accordance with the combustion reaction time Bt. In this example, the combustion reaction time Bt is converted to a crank angle interval by using the engine revolution speed Ne. The MBT is determined so as to achieve a combustion pressure peak at a predetermined crank angle position slightly retarded after the compression top dead center. The MBT is set at a crank angle position advanced from the predetermined crank angle position for the combustion pressure peak, by the crank angular interval corresponding to the combustion reaction time Bt.

In this way, this ignition timing control system can estimate the combustion speed accurately in accordance with the internal EGR quantity, determine MBT accurately even in a transient state, provide optimum ignition timing control performance, and thereby improve the fuel consumption.

In the illustrated embodiments, engine 1 is a prime mover of a motor vehicle, and control unit 10 includes, as a main component, at least one onboard computer.

This application is based on a Japanese Patent Application No. 11-344216 filed in Japan on Dec. 3, 1999, and a Japanese Patent Application No. 2000-367770 filed in Japan on Dec. 1, 2000. The entire contents of these Japanese Patent Applications Nos. 11-344216 and 2000-367770 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An apparatus comprising:
   an internal EGR quantity estimating section to calculate a base internal EGR quantity in accordance with an exhaust valve closing timing and an engine speed of an engine, and to set an estimated internal EGR quantity equal to the base internal EGR quantity when there is no valve overlap between an exhaust valve opening period and an intake valve opening period.

2. The apparatus as claimed in claim 1, wherein the apparatus is an engine cylinder intake air quantity estimating apparatus; and the apparatus further comprises:
   an engine cylinder intake air quantity estimating section to calculate an engine cylinder intake air quantity in accordance with the estimated internal EGR quantity.

3. The apparatus as claimed in claim 1, wherein the apparatus is an engine control apparatus; and the apparatus further comprises:
   a controlling section to control the engine in accordance with the estimated internal EGR quantity.

4. The apparatus as claimed in claim 3, wherein the controlling section is configured to control an ignition timing of the engine in accordance with the estimated internal EGR quantity.

5. The apparatus as claimed in claim 3, wherein the controlling section is configured to control an intake valve closing timing of the engine in accordance with the estimated internal EGR quantity.

6. The apparatus as claimed in claim 1, wherein the internal EGR quantity estimating section uses, as the exhaust valve closing timing, a target exhaust valve closing timing, for calculating the estimated internal EGR quantity.

7. The apparatus as claimed in claim 1, wherein the internal EGR quantity estimating section is configured to calculate the base internal EGR quantity in accordance with the exhaust valve closing timing and the engine speed; to set the estimated internal EGR quantity equal to the base internal EGR quantity without modification when there is no valve overlap between an exhaust valve opening period and an intake valve opening period; and to determine the estimated internal EGR quantity by modifying the base internal EGR quantity with a valve overlap condition of the engine when there is a valve overlap.

8. A method for an engine, the method comprising:
   obtaining information on an exhaust valve closing timing, and an engine speed;
   calculating a base internal EGR quantity in accordance with the exhaust valve closing timing and the engine speed; and
   setting an estimated internal EGR quantity of the engine equal to the base internal EGR quantity when there is no valve overlap between an exhaust valve opening period and an intake valve opening period.

9. The method as claimed in claim 8, wherein, as the exhaust valve closing timing, a target exhaust valve closing timing is used for calculating the estimated internal EGR quantity.

10. The method as claimed in claim 8, wherein the method is an engine cylinder intake air quantity calculating method, and the method further comprises:
    calculating an engine cylinder intake air quantity in accordance with the estimated internal EGR quantity.

11. The method as claimed in claim 8, wherein the method is an engine control method, and the method further comprises:
    controlling the engine in accordance with the estimated internal EGR quantity.

12. The method as claimed in claim 11, wherein the method is an engine ignition timing control method, and ignition timing of the engine is controlled in accordance with the estimated internal EGR quantity.

13. The method as claimed in claim 11, wherein the method is an engine valve timing control method, and an intake valve closing timing of the engine is controlled in accordance with the estimated internal EGR quantity.

14. The method as claimed in claim 13, wherein the intake valve closing timing is controlled in accordance with the estimated internal EGR quantity and a target intake air quantity calculated in accordance with an engine operating state.

15. An apparatus for an engine, the apparatus comprising:
    means for collecting information on an exhaust valve closing timing, an intake valve opening timing and an engine speed of the engine; and means for calculating an estimated internal EGR quantity of the engine in accordance with the exhaust valve closing timing, the intake valve opening timing and the engine speed, the means for calculating the estimated internal EGR quantity including means for calculating a base internal EGR quantity in accordance with the exhaust valve closing timing and the engine speed, and for setting the estimated internal EGR quantity equal to the base internal EGR quantity when there is no valve overlap between an exhaust valve opening period and an intake valve opening period.

16. The apparatus as claimed in claim 15, further comprising means for controlling an engine operating parameter of the engine in accordance with the estimated internal EGR quantity.

17. The apparatus as claimed in claim 15, wherein the means for calculating the estimated internal EGR quantity includes means for using, as the exhaust valve closing timing, a target exhaust valve closing timing, for calculating the estimated internal EGR quantity.

18. The apparatus as claimed in claim 15, wherein the means for calculating the estimated internal EGR quantity includes means for calculating the base internal EGR quantity in accordance with the exhaust valve closing timing and the engine speed; for setting the estimated internal EGR quantity equal to the base internal EGR quantity without modification when there is no valve overlap between an exhaust valve opening period and an intake valve opening period; and for determining the estimated internal EGR quantity by modifying the base internal EGR quantity with a valve overlap condition of the engine when there is a valve overlap.

19. The apparatus as claimed in claim 15, wherein the apparatus further comprises means for calculating an engine cylinder intake air quantity in accordance with the estimated internal EGR quantity.

20. An apparatus comprising:
an internal EGR quantity estimating section to calculate an estimated internal EGR quantity of an engine in accordance with an exhaust valve closing timing, an intake valve opening timing and an engine speed of the engine, wherein the apparatus is an engine control apparatus;
a controlling section to control the engine in accordance with the estimated internal EGR quantity, wherein the controlling section is configured to control an intake valve closing timing of the engine in accordance with the estimated internal EGR quantity; and a target air quantity calculating section to calculate a target air quantity in accordance with an engine operating state, and the controlling section is configured to control the intake valve closing timing in accordance with the target air quantity and the estimated internal EGR quantity.

21. A method for an engine, the method comprising:
obtaining information on an exhaust valve closing timing, an intake valve opening timing and an engine speed;
calculating an estimated internal EGR quantity of the engine in accordance with the exhaust valve closing timing, the intake valve opening timing and the engine;
controlling the engine in accordance with the estimated internal EGR;
calculating a residual gas ratio in accordance with the estimated internal EGR quantity, the residual gas ratio being a mass ratio of a residual gas quantity to a total cylinder gas quantity;
calculating a combustion speed in accordance with the residual gas ratio;
calculating a combustion reaction time from a start of ignition to a peak of a combustion pressure, in accordance with the combustion speed; and
calculating a maximum torque producing ignition timing in accordance with the combustion reaction time, to control an actual ignition timing of the engine to achieve the maximum torque producing ignition timing.

22. A method for an engine, the method comprising:
obtaining information on an exhaust valve closing timing, an intake valve opening timing and an engine speed;
calculating an estimated internal EGR quantity of the engine in accordance with the exhaust valve closing timing, the intake valve opening timing and the engine speed wherein the method is an engine cylinder intake air quantity calculating method; and
calculating an engine cylinder intake air quantity in accordance with the estimated internal EGR quantity, wherein the method further comprises calculating a cylinder air volume quantity in accordance with the estimated internal EGR quantity and a cylinder volume calculated from the intake valve closing timing; the engine cylinder intake air quantity is an engine cylinder intake air mass quantity which is the mass of air inducted into a cylinder section of the engine; and the engine cylinder intake air mass quantity is calculated in accordance with the cylinder air volume quantity, an intake manifold air mass quantity and an intake manifold volume.

23. The method as claimed in claim 22, further comprising calculating the intake manifold air mass quantity by calculating a balance between an intake manifold inflow air mass quantity which is the mass of air flowing into an intake manifold section of the engine, and an intake manifold outflow air mass quantity which is the mass of air flowing out of the intake manifold section.

24. A method for an engine, the method comprising:
obtaining information on an exhaust valve closing timing, an intake valve opening timing and an engine speed; and
calculating an estimated internal EGR quantity of the engine in accordance with the exhaust valve closing timing, the intake valve opening timing and the engine speed, wherein the method is an internal EGR quantity estimating method; and wherein the method further comprises calculating a base internal EGR quantity in accordance with the exhaust valve closing timing and the engine speed; and the estimated internal EGR quantity is set equal to the base internal EGR quantity without modification when there is no valve overlap between an exhaust valve opening period and an intake valve opening period, and the estimated internal EGR quantity is determined by modifying the base internal EGR quantity with a valve overlap condition of the engine when there is a valve overlap.

25. The method as claimed in claim 24, wherein the method further comprises calculating an overlap correction quantity in accordance with the overlap condition; and the estimated internal EGR quantity is determined by addition of the overlap correction quantity to the base internal EGR quantity when there is a valve overlap between the exhaust valve opening period and the intake valve opening period.

26. The method as claimed in claim 25, wherein the estimated internal EGR quantity is increased by increasing the overlap correction quantity with increase in a valve overlap quantity between the exhaust valve opening period and the intake valve opening period.

27. The method as claimed in claim 26, wherein the estimated internal EGR quantity is increased by increasing the overlap correction quantity with increase in an absolute value of an intake pressure on a negative pressure side.

28. The method as claimed in claim 26, wherein the valve overlap quantity is determined by converting a valve overlap angular interval expressed as an angular distance in crankshaft rotation to a valve overlap time period.

29. The method as claimed in claim 25, wherein the estimated internal EGR quantity is decreased by decreasing the overlap correction quantity with increase in a retard of the exhaust valve closing timing from an exhaust top dead center when the exhaust valve closing timing is after the exhaust top dead center.

30. The method as claimed in claim 25, wherein the method further comprises calculating a base correction quantity in accordance with a valve overlap quantity; and calculating an intake pressure modification quantity in accordance with an intake pressure and the exhaust valve closing timing; and the overlap correction quantity is determined by modifying the base correction quantity with the intake pressure modification quantity.

31. The method as claimed in claim 30, wherein the method further comprises determining an intermediate quantity in accordance with the valve overlap quantity; setting the base correction quantity equal to the intermediate quantity when the exhaust valve closing timing is before an exhaust top dead center; and determining the base correction quantity by subtraction from the intermediate quantity, of a subtrahend proportional to a retard quantity of the exhaust valve closing timing with respect to the exhaust top dead center when the exhaust valve closing timing is after the exhaust top dead center.

32. The method as claimed in claim 30, wherein an intake pressure modification coefficient is determined, as the intake pressure modification quantity, in accordance with the intake pressure, the exhaust valve closing timing and the valve overlap quantity; and wherein the overlap correction quantity is calculated by multiplying the base correction quantity by the intake pressure modification coefficient.

33. The method as claimed in claim 30, wherein the intake pressure modification quantity is increased as an absolute value of the intake pressure increases on a negative side, and the intake pressure modification quantity is increased in accordance with a retard quantity of the exhaust valve closing timing from an exhaust top dead center when the exhaust valve closing timing is after the exhaust top dead center and the absolute value of the intake pressure is higher than a predetermined level.

34. The method as claimed in claim 24, wherein the base internal EGR quantity is increased with increase in an interval from one of an exhaust top dead center and the exhaust valve closing timing to the other.

35. The method as claimed in claim 24, wherein the base internal EGR quantity is increased as the engine speed increases when the exhaust valve closing timing is before an exhaust top dead center.

36. The method as claimed in claim 24, wherein the base internal EGR quantity is decreased as the engine speed increases when the exhaust valve closing timing is after an exhaust top dead center.

* * * * *